United States Patent [19]
Bryngdahl

[11] 3,880,497
[45] Apr. 29, 1975

[54] METHOD OF STORING OPTICAL INFORMATION ON A RANDOM CARRIER

[75] Inventor: Olof Bryngdahl, Cupertino, Calif.

[73] Assignee: Xerox Corporation, Stamford, Conn.

[22] Filed: Nov. 8, 1973

[21] Appl. No.: 414,007

Related U.S. Application Data

[63] Continuation-in-part of Ser. No. 339,677, March 9, 1973, abandoned.

[52] U.S. Cl. ............................ 350/162 SF; 350/3.5
[51] Int. Cl. .............................................. G02b 5/18
[58] Field of Search ........................ 350/3.5, 162 SF

[56] References Cited
UNITED STATES PATENTS
3,408,143  10/1968  Mueller ........................ 350/162 SF OTHER PUBLICATIONS
Groves New Technique of Image Multiplexing Using Random Diffuser, Jrnl. of the Optical Soc. of America, Vol. 62, No. 9, September 1972.
Caulfield, Specifically Randomized Data Make for Holographic Storage, Applied Optics, Vol. 9, No. 11, November 1970.

*Primary Examiner*—Paul L. Gensler

[57] ABSTRACT

The present invention relates to the storage of optical information on a random or pseudo-random carrier. Such a carrier is comprised of a pseudo-random distribution of pulses, which distribution is modulated in accordance with the intensity distribution from an illuminated object. Provided that the spatial variation in the pulse parameters is at least on the order of the wavelength of light, a microstructure of the original object is formed which is coded with intensity information from the object. A recording of the microstructure may be made. By illuminating this recording with coherent light, the information stored thereon may be processed for reconstructing an image of the original object or extracting information from the recording.

14 Claims, 19 Drawing Figures 3,880,497

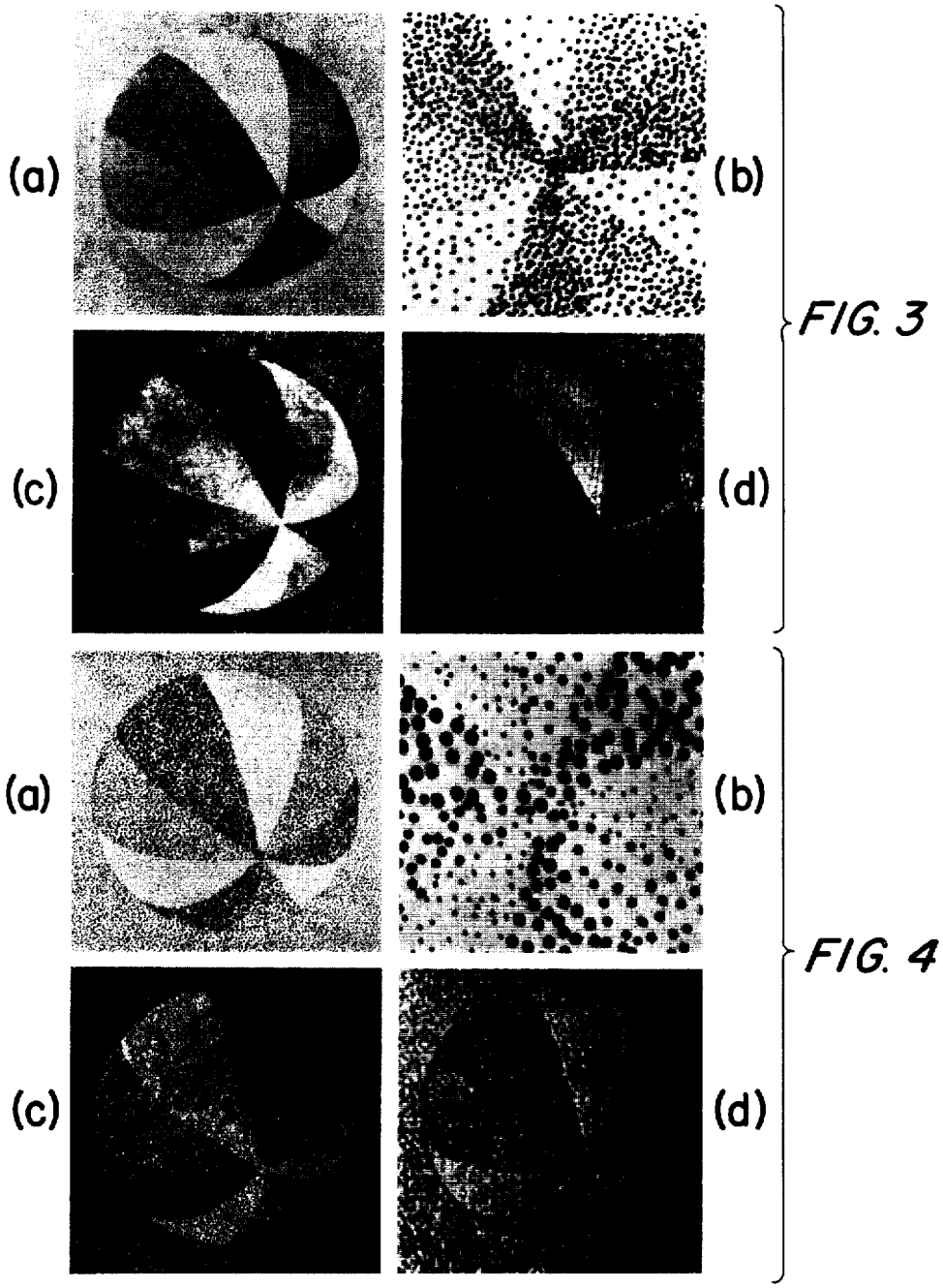

METHOD OF STORING OPTICAL INFORMATION ON A RANDOM CARRIER

This invention is a continuation-in-part of copending application Ser. No. 339,677, filed Mar. 9, 1973, now abandoned.

BACKGROUND OF THE INVENTION

The invention relates to a method and apparatus for storing optical information on a carrier, and more particularly to storing optical information on a random carrier.

Spatial modulation of optical signals is a desirable technique which allows modification of the parameters of a light wave in order to store or encode optical information on the wave. Such parameters include physical properties such as amplitude, phase, temporal frequency, or polarization or geometrical properties such as size, shape, location, or spatial frequency. Spatial modulation of optical signals have been effectively employed in applications including carrier-frequency photography, holography, and halftone printing.

An optical carrier is a transmitted wave with a distribution which may be modulated by object information. Temporal and spatial frequency carriers are well known types of carriers in image transmission. The spatial frequency carrier is used as a modulator of the temporal frequency carrier. Spatial carriers may be classified according to their structures; two major kinds are regular or periodic and random carriers. Pseudo-random carriers are a subgroup to random carriers. Almost all structures referred to as random belong to this subgroup as complete randomness is impossible to attain. A carrier may be more or less complicated with an increasing amount of regularity varying from one to three dimensions.

Existing applications of random carriers are irregular printing rasters, fine grain printing paper, and various image display screens. All of these applications are characterized by expected spatial frequencies. Their spectra are isotropic, i.e., independent of the direction in the Fraunhofer diffraction plane, with associated probability distributions. Random carriers in optical image processing in the form of noise with a multiplicative character can be modulated by object information. Further, this type of recording can be made periodic, namely, laterally displaced copies of the same distribution introduce a regularity that implies localization in a Fraunhofer diffraction plane. Then, conventional spatial filtering techniques can be applied.

The latter situation is more specifically characterized in a paper by C. P. Grover, *Optical Communications* 5,256 (1972).

It is an object of the present invention to apply random type carriers in optics.

It is a further object of the present invention to store optical information from an original object on a carrier that is comprised of a random spatial variation of pulses which is modulated in accordance with the information to be stored.

It is another object of the present invention to record a microstructure of the original object which is coded with intensity distribution information resulting from an illumination of the object.

It is yet another object of the present invention to store optical information on a random carrier so that the power spectrum of the resulting recording is structured to perform spatial filtering.

It is still another object of the present invention to modulate the pulse density of a random carrier in order to store optical information thereon.

It is another object of the present invention to reconstruct the image of the original object from the recorded microstructure or to extract information therefrom.

Other objects of the invention will be evident from the description hereinafter presented.

SUMMARY OF THE INVENTION

The invention provides for the storage of optical information on a random or pseudo-random carrier. A random carrier may be obtained by randomly deviating the pulses of a periodic structure of a regular carrier from their original positions. Pseudo-random carrier exist naturally in the form of irregular printing rasters, grain distributions in emulsions or printing paper, wrinkling of deformographic materials, and forms of imaging on display screens. In order to store information on a random carrier, the distribution of pulses constituting the carrier must be modified or modulated in accordance with the information to be stored. A recording of the modified distribution is made. Ligh diffracted from the recording when illuminated with spatially coherent light may be imaged onto a final image plane where the image of the original object is reconstructed.

An additional feature of the invention is that the distribution of pulses is modulated in accordance with the intensity distribution from an original object. Provided that the spatial variation in the pulse parameters is at least of the order of the wavelength of light, a microstructure of the original object is formed which is coded with the intensity information from the object.

Another feature of the invention is that two Fourier transforms are made of the diffracted light from the recording. Between the two transforms, spatial filtering is performed in the diffraction plane for the reconstruction of an image in the final image plane or the extraction of information from the recording.

Still another feature of the invention is to randomize the pseudo-random distribution of the pulses constituting the carrier to introduce micro-texture in the image in the final image plane when the recording of the modulated, randomized carrier is utilized for image reconstruction.

Yet another feature of the invention is the use of pulse denisty modulation in conjunction with a suitable random carrier having a pseudo-random distribution. In particular, such modulation is effective in achieving the desired phase distribution or randomization in a recording.

The invention provides an optical recording system which is insensitive to minor inhomogeneities of any optical system used for reconstruction of images from the recording and to moire effects which would be associated with the periodicity in the original object.

Still another feature of the invention is that the illumination of the recording with spatially coherent light results in a power spectrum of the random carrier in the diffraction plane which may be ring-shaped with negligible contribution corresponding to higher diffraction orders. This feature simplifies the introduction and use of spatial filtering operations in reconstructing an image of the original object or extracting information from the recording.

These and other features which are considered to be characteristic of this invention are set forth with particularity in the appended claims. The invention itself, however, as well as additional objects and advantages thereof, will best be understood from the following description in conjunction with the accompanying drawings.

BRIEF DESCRIPTION OF THE DRAWINGS

FIGS. 3(a)–3(d) are an illustration of spatial pulse-density modulation of a random carrier, (a) the recording, (b) a magnified portion of the recording, (c) reconstructed image using scattered light; and (d) reconstructed image using unscattered light.

FIGS. 4(a)–4(d) are an illustration of spatial pulse-width modulation of a random carrier, (a) the recording, (b) a magnified portion of the recording, (c) reconstructed image using scattered light, and (d) reconstructed image using unscattered light.

DESCRIPTION OF THE PREFERRED EMBODIMENT

Figure 1:
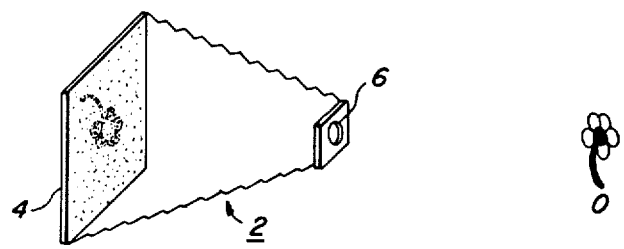
FIG. 1 is a schematic drawing of a recording of an object illuminated with ambient light.

In FIG. 1 is shown an object O which is imaged onto a recording 4 by a camera housing 2 which has an aperture 6. The object O is illuminated by ambient light. The recording 4 is a physical element which is responsive to the light distribution from the original object O, such as transparent emulsions or deformographic material. In this embodiment the recording 4 is a photographic emulsion which is characterized by a pseudo-random distribution of grains or pulses, which have a spatial variation on the order of the wavelength of light. A suitable emulsion would be Kodak PLUS-X film.

When exposed to the light distribution from the object O through the aperture 6, the distribution of the grains is modified or modulated in accordance with the intensity distribution from the object O. The higher the intensity the more grains or pulses are obtained in the recording 4. Such modulation which results in a density distribution of grains in relation to the intensity distribution from the object O is to be referred to as pulse-density modulation. By varying the size of the aperture 6, the intensity of the light on the recording 4 may be varied and, thereby, the modulation of the distribution of grains may be controlled.

The distribution of grains in the recording 4 is a microstructure which serves as a carrier for the storage of optical information from the object O. When this microstructure is modulated by the intensity distribution from the object O, it is thereby coded with intensity information. In conventional photography, it is not desirable to have grains of the size required in the present invention, since they would be disturbing elements in forming an image of the original object O on the photographic film. In the present invention a microstructure of the object O is formed of resolvable elements in the recording 4. From such a recording, image processing or image reconstruction may be performed.

Other pulse distributions, such as speckles, particles, inhomogeneities and apertures, as well as other elements that influence a light wave, with a fairly random nature may be used as carriers. A suitable carrier may even be obtained by allowing the elements of a periodic structure of a regular array to randomly deviate from their original positions. Several physical properties inherently form random or pseudo-random distributions, i.e., film grain noise and natural wrinkling of phase media such as gelatin layers, thermoplastics, elastomers and other deformographic media. Therefore, these materials may serve as a suitable carrier in this preferred embodiment. A dot-pattern from a mask or screen may also be superimposed upon the object distribution to obtain a randomized distribution of pulses which would serve as a carrier. A recording of such a carrier could then be made on conventional films which would not naturally have resolvable grains.

Figure 2A:
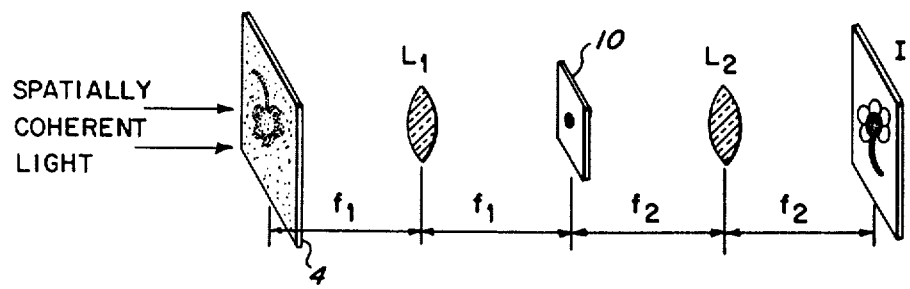
FIGS. 2(a) and (b) are schematic drawings of reconstruction arrangements for imaging an object onto a recording.

In order to reconstruct an image of the original object O or to otherwise extract information from the recording 4, the recording 4 is illuminated with spatially coherent light as shown in FIG. 2. As embodied in FIG. 2(a), two simple lenses $L_1$ and $L_2$ having respective focal lengths $f_1$ and $f_2$ are positioned in the optical path between the recording 4 and the final image plane I. In the Fraunhofer diffraction plane (frequency plane), at a distance $f_1$ from lens $L_1$ and a distance $f_2$ from lens $L_2$, an optical filter or stop 10 is located.

The diffracted light from the recording 4 is imaged by the lens $L_1$, which performs a first Fourier transform of the distribution of pulses in the wavefront. In the frequency plane is formed a Fourier spectrum. With the filter 10 we may block out portions of this light distribution in the frequency plane to provide for optical processing or the reconstruction of an image of the original object in the final image plane I. The unblocked light distribution in the frequency plane is imaged through the lens $L_2$, which performs a second Fourier transform, to provide a reconstructed image in the image plane I.

Figure 2B:
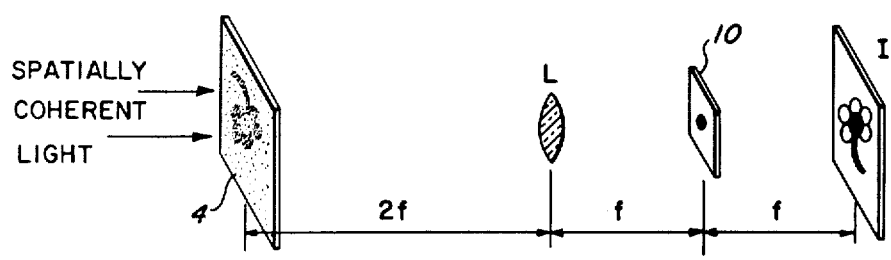

In FIG. 2(b) is shown an alternative convolution of the element of FIG. 2(a) using a single lens to achieve image reconstruction.

To provide a reconstructed image of the original object O in the plane I, without introducing optical processing, a central stop would serve as the filter 10 in the diffraction or frequency plane. If optical processing is desired to enhance or modify the final image, then specific filters may be introduced to achieve particular results. Such filter selection is taught by Goodman in *Introduction to Fourier Optics* (McGraw-Hill, 1968).

In order to display the stored information or recording, spatial filtering is thus used to extract object information onto a final image plane I by illuminating the recording 4 with spatially coherent light. In the intermediate Fraunhofer diffraction plane undiffracted light is blocked revealing an isotropic spectrum which is independent of the direction in the Fraunhofer diffraction plane. This phenomenon renders the optical system insensitive to otherwise disturbing moire-effects.

While the above result of producing an isotropic spectrum, which is characterized by a ring-structure, is unique as provided by the invention, previous experiments by others have viewed similar frequency spectrums. For example, Exner in the late 1800's repeated the Fraunhofer's experiment and called the structures in the diffraction pattern Fraunhofer's rings. Also, Debye and Scherrer in 1916 reported on the observation of a circular diffraction halo surrounding a central portion when a liquid is illuminated with a narrow beam of X-rays. Similar patterns also occur from amorphous solids and imperfect crystals. The technique involved in the last situation constitutes a convenient investigative tool which has become standard is crystallographic analysis.

It is assumed that, in all practical situations in which the invention is practiced, the shape of the spectrum would characterize a pseudo-random carrier. If the carrier constituted a periodic one-dimensional pattern, one may represent the distribution as a row of small apertures ($\delta$-functions), regularly spaced with a given period $p$, in a mask placed in collimated light. The pattern is to be modified in order to introduce a random or pseudo-random distribution by achieving some degree of irregularity in the locations of the apertures. One technique which achieves the desired distribution is to displace the apertures to conform to a Gaussian distribution around their true positions as is shown by Lipson and Lipson, *Optical Physics* (Cambridge University Press, Cambridge, 1969), Page 399. The autocorrelation of the resulting irregular pattern is a row of evenly spaced Gaussians, with the Gaussian at the origin being a $\delta$-function. The irradiance distribution in the diffraction pattern of the randomly displaced apertures is given by the Fourier transform of the autocorrelation. This transform would be the transform of a periodic function of Gaussians subtracted and added by the transforms of the center Gaussian, and true-center $\delta$-function. Thus, an irregularity of this kind will not destroy the sharpness of the diffraction peaks. It will, on the other hand, add a background that is zero at the origin but increases with the distance from the origin of the diffraction pattern.

Another approach to randomize the distribution is to modify the location of the apertures so that the spacing between the closest neighbors are independent and vary around the average distance p, as would be taught by Guinier, *X-Ray Diffraction in Crystals, Imperfect Crystals, and Amorphous Bodies* (Freeman, San Francisco, 1963), Chapter 9.1. If the spacings all follow the same statistical distribution $h(x)$, the distribution function for the distance between second neighbors is $$h_2(x) = h(x) * h(x)$$

and in general $$h_n(x) = h(x) * h(x) * \ldots * h(x) \ (n \text{ times}) \quad (1)$$

and the average distance between the $n$th neighbors is $np$. The distribution around $np$ will broaden with increasing $n$; it will overlap the distribution around $(n-1)p$ and $(n+1)p$, and, finally, the total distribution will become uniform. The total distribution is $$f(x) = \delta(x) + \sum_{n=1}^{\infty} h_n(x) + \sum_{n=1}^{\infty} h_n(-x), \quad (2)$$

and its Fourier transform, as a function of frequency $\nu$, is $$I(\nu) = 1 + 2 \sum_{n=1}^{\infty} \exp(-2\pi^2 n^2 \nu^2 \Delta^2) \cos(2\pi n \nu p), \quad (3)$$

where $\Delta$ is the standard deviation of $h(x)$; and for small values of $\Delta/p$, the amount of the $n$th maximum of this curve is $$I_{max}(n) = \{1+\exp(-2\pi^2 n^2 \Delta^2/p^2)\}/\{1-\exp(-2\pi^2 n^2 \Delta^2/p^2)\}$$
$$\cong p^2/\{\pi n^2 \Delta^2\}. \quad (4)$$

The area under each pseudoperiod $1/p$ of the curve represented by Eq. (3) is constant ($=1/p$). For small $n$-values, the width of the $n$th peak is proportional to $$n^2 \Delta \ 2/p^3.$$

For real objects where the transforms are two-dimensional, the peaks become rings and the cosine in Eq. (3) will be replaced by a Zeroth order Bessel function. The widths of the rings increase with both $\Delta$, which is the amount of randomness, and $n$; the irradiance of the rings decrease with increasing $\Delta$ and $n$; complete randomness will result in a constant irradiance in the frequency plane.

Both of these ways of introducing irregularity among the pulses constituting a pseudorandom carrier are feasible. However, some of their characteristics, as shown above, are fundamentally different, and for specific applications, either one of the two types will be more suited or only one can be used. For example, only the second kind is possible in those cases where such a degree of localization in the frequency plane is required that spatial filtering techniques are applicable. Of course, in addition to the two ways visualized above, there are numerous other possibilities for creating irregular carriers with structured power spectra.

As mentioned previously, the use of well-known spatial filtering techniques may be employed to provide for optical processing of the light distribution in the diffraction plane.

The present invention provides another mechanism for processing an image of the original object in the final image plane. By artificially randomizing the pseudo-random distribution of pulses which constitute the carrier, a micro-texture may be introduced in the final image. This feature is important in that the microtexture in images eliminates the effects of a degraded optical system. Particularly in the use of coherent light such effects could otherwise be a disturbing influence in the reconstruction of images.

One means of artificially randomizing the carrier is to photograph objects, using the particular recording media disclosed herein including bleached photographic materials, through a randomized screen. In this way, after development, a microstructure of the object will be obtained in the recording 4 which, when optically processed as described above, will yield a microtexture in the final image. The microtexture in the final image is related to the microstructure in the recording 4 by the Fourier transforms in the reconstruction process. Other means of artificially randomizing the carrier is by introducing speckle patterns by illuminating the original object O with spatially coherent light. The speckle patterns serve as a randomized microstructure on the recording media which will produce a microtexture in the final image.

In the illustrative embodiment a grainy recording medium serves as the carrier. Formation of an image with a conventional camera onto this material will then, after development, result in a pulse density modulation (PDM) recording. With increasing light level, i.e., exposure, the number of developed grains will increase and thus the pulse density. Another embodiment involves the introduction of randomness in the light which impinges on the recording medium. This may be achieved using the speckling effect which occurs in image formation in coherent light. Thus, if a diffuse object is imaged with a conventional imaging system using coherent radiation, such as collimated laser light, speckles will show in the image. The size, i.e., distribution, of these speckles may be influenced by the aperture of the optical imaging system, the wavelength of light, the smoothness of the surface of the object, and other physical parameters. The other embodiment involving pulse density modulation is to make a photograph and then introduce the carrier in the recording in an artificial or synthetic way, as above. One may change the pulse characteristic with either the intensity, color with the use of filters, or any other parameter describing the image. If the recording is formed by a computer in the first instance, then it is appropriate to introduce the carrier in the sampling procedure of the picture elements.

Another particular modulation scheme that would appear to be practical would be in varying the width or size of the pulses constituting the carrier. This scheme is realized in the use of coherent light to illuminate the object O as discussed above. While the resulting speckling effect is useful in pulse density modulation another effect is to achieve what may be referred to as pulse width is varied according to the signal information.

In spatial pulse width modulation (PWM) of a random carrier, the relationship between the amount of diffracted light and the pulse width is similar to that relationship established for a regular carrier. The ratio of pulse width to average spatial frequency is, though, the decisive parameter in modulating a random carrier. For spatial pulse density modulation (PDM), changes in the number of pulses per unit area influences the ratio of pulse width to average pulse separation and causes the amount of diffracted light to change, as also is the case for the PWM. These modulation schemes differ in the way the information is to be distributed in a diffraction plane. For PDM, the position in the frequency plane is related to the strength of the object signal in that with a larger pulse density one achieves a larger diameter of the main diffraction ring. This phenomenon is in contrast to the corresponding PWM scheme in which the spectrum size is independent of the amplitude of the modulating signal. A combination of PDM and PWM appears especially significant in that the combination reveals similarities to situations in regular carrier-frequency photography where the frequency or orientation of the carrier is used for signal separation in a frequency plane. The pulse width may, of course, vary around a certain average value, while the pulse density may vary randomly. As a result, a doubly random distribution is obtained when the combination of the two modulation schemes are applied. One then would achieve a randomness of the reconstructed light in regard to both it fine structure and its intensity fluctuations.

The invention has been successfully practiced using a random or pseudo-random carrier suitable for carrier-frequency photography type applications. Large sized, computer-generated, ink pen art may be produced and photographically reduced to a convenient scale. 649F plates, bleached to increase the diffraction efficiency, may be used. For reconstruction, these recordings may be placed in collimated laser light (6328 A) and imaged by a telecentric lens system, such as two $f = 200$mm lenses, onto a final image plane. Masks may be introduced in the Fraunhofer diffraction plane between lenses. The masks may be selected to either block the central spot (0th order) or everything but the central spot. When the central spot in the Fraunhofer diffraction plane is blocked, the resulting reconstructions are seen to be independent of the polarity of the recording. This feature is common to images formed by diffracted light from all types of carrier recordings, such as holograms and carrier-frequency photographs. However, when a mask is introduced that lets light through only in the central portion, 0th order reconstructions result which are seen to have a more complicated polarity dependence. For phase recordings the reconstructions formed by the 0th order light are negatives to those formed by the diffracted light. With amplitude recordings, the 0th order reconstructions are dependent on diffracted as well as abosrbed light, and the reconstructions are proportional to the transmission and have the same polarity as the recordings.

Spatial filtering techniques well known to those skilled in the art may be applied to PDM signals since different pulse densities in a recording result in different distributions in a Fraunhofer diffraction plane. Commercially available overlay screens in a random pattern may be used in the original art work. In this application involving spatial filtering in the frequency plane pseudo-random carriers may only be used. A tendency to smear in the frequency plane may be restricted to certain directions, e.g., any linear direction, by controlling the pseudo-randomness. The autocorrelation function of the carrier is one indication of the amount of pseudo-randomness. By defining the desired autocorrelation function, the proper amount of control may be attained. A transition of a regular pattern to a pseudo-random and to a random pattern causes redistribution of its autocorrelation function evidenced by the depression of the outer portion of the periodic structure until it approaches the shape of a single $\delta$-function. As above, reconstructions are provided by means of a telecentric lens system.

Reconstructions may be made with either monochromatic or white light. Illumination of the modulated object with monochromatic, collimated laser light gives a diffraction pattern consisting of a plurality of concentric rings, whose diameters correspond to areas with a certain intensity in the object. Since these rings are generally well separated, it is possible to independently influence the light related to these areas. In this way, one may arbitrarily chose an image characteristic. For example, this observation would be implemented by developing the reconstruction with light which is associated with only one of the diffraction pattern rings. Alternatively, a mask could be employed which blocks only the light from one of the diffraction rings. It may be of interest to note that, in many of these reconstructions, a speckle pattern is evident in the background which is caused by the phase randomization.

FIGS. 3(a) and 3(b) show a PDM recording (before bleaching). FIG. 3(b) is a magnification of the area around the apexes of the ball sectors in FIG. 3(a). The ball diameter in the recording was 9.7 mm. Four different pulse densities occur; there are about 80, 350 and 510 pulses/mm in the ball sectors and 160 pulses/mm in the background. The pulses all have a diameter of about 18 μm and were placed at random; the only restriction was to avoid overlapping. The reconstructions are shown in FIGS. 3(c) and 3(d); FIG. 3(c) results when a central stop is introduced in the Fraunhofer-diffraction plane and FIG. 3(d) when a mask is introduced that lets light through only in the central portion.

FIG. 4 illustrates the results with PWM. The ball diameter here is also 9.7 mm. There are about 110 pulses/mm in all areas. However, the pulse diameter varies: 18, 36, and 62 μm in the ball sectors and 27 μm in the background.

The reconstructions shown in FIGS. 3(c) and 4(c) are independent of the polarity of the recording. This is a feature common to images formed by diffracted light from all types of carrier recordings, such as holograms and carrier-frequency photographs. The Oth-order reconstructions, on the other hand, have a more-complicated polarity dependence. For phase recordings (see FIGS. 3(d) and 4(d)), the reconstructions formed by Oth-order Oth-order light are negatives to those formed by the diffracted light. With amplitude recordings, the Oth-order reconstructions are dependent on diffracted as well as absorbed light, and the reconstructions will have the same polarity (proportional to the transmittance) as the recordings.

Figure 5:
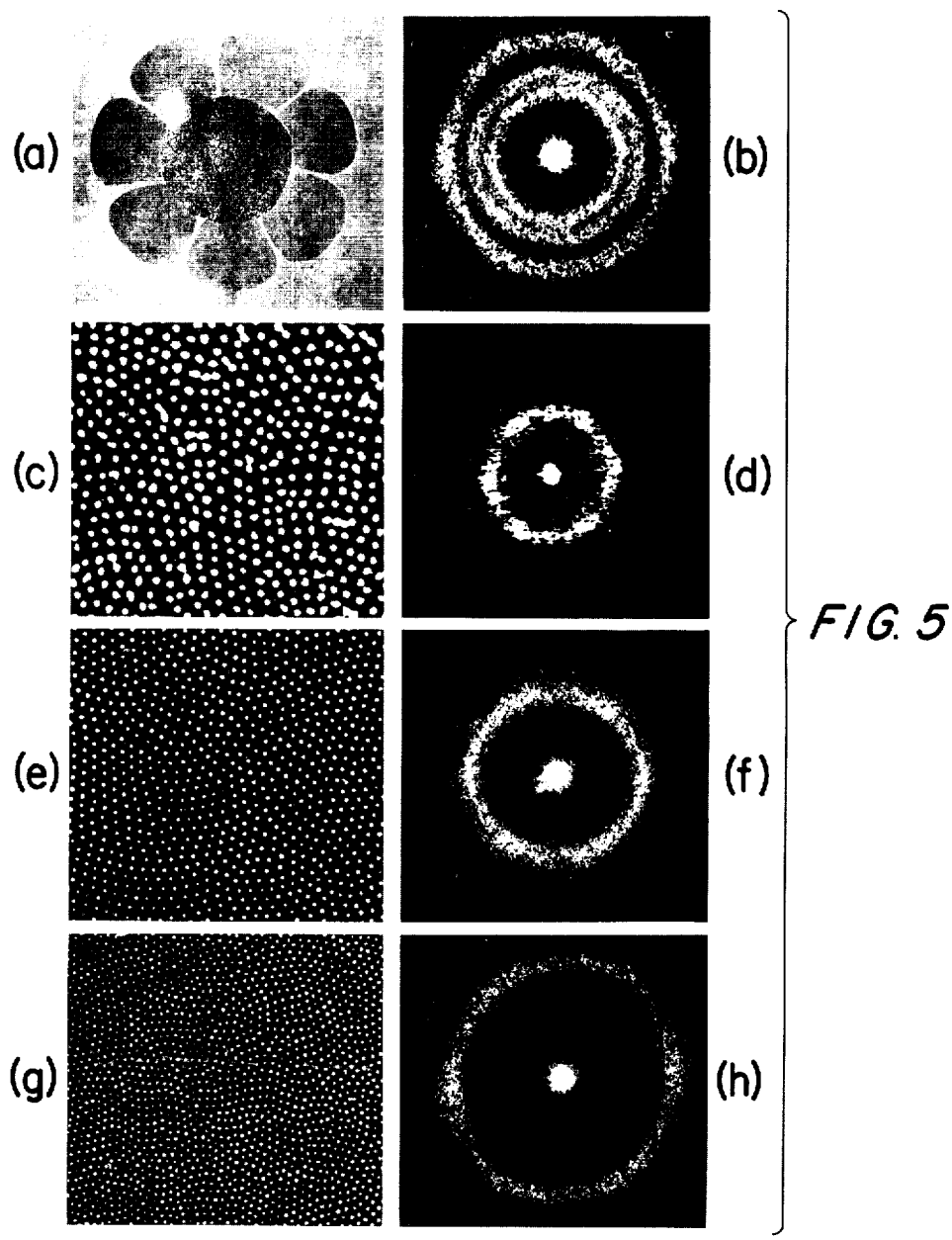
FIGS. 5(a)–5(h) are an illustration of the recording and reconstruction of a modulated flower.

Illumination of a random pulse pattern with white light results in a spectrum decomposition of the diffracted ring with the blue end of the spectrum closest to the Oth order. The spectrum rings may be separated sufficiently to allow reconstruction of an object in color. Reconstruction in color would be possible by using a spatial filter dimensioned to transmit a wanted portion of the colors in the spectrum rings. In one successful application, the diffraction pattern of the modulated object was constructed of light from a xenon arc which consisted of three spectrum rings. Any color combinations between those indenfiying the object were possible by using a spatial filter in the shape of three transparent rings to match the three spectrum rings. Shown in FIG. 5 is the diffraction pattern of the modulated flower in white light from a xenon arc which consisted of three spectrum rings. In FIG. 5(a) is shown the recording, (b) its Fraunhofer-diffraction pattern, (c) the carrier in the center of the flower, (d) diffraction pattern of (c), (e) the carrier in the petals, (f) diffraction pattern of (e), (g) the carrier in the background, and (h) diffraction pattern of (g).

When using white light for image reconstruction from random carrier photographs, identifying features occur on a microscopic scale. The spectral ring shaped diffraction patterns show characteristic radial streaks. Furthermore, random color inhomogeneities or dot patterns are observable in solid areas of the image when the dimensions of the spatial filter are decreased. At the same time, the purity of the colors increases.

In addition to PDM and PWM, other modulation schemes may be used in modulating a random carrier. These would include pulse amplitude modulation (PAM), pulse position modulation (PPM), pulse frequency modulation (PFM) and pulse code modulation (PCM). PAM, in particular, would be easily applicable in combination with conventional photography.

Pseudo-randomness may be introduced in even more ways. For example, a regular carrier may be converted to a pseudo-random one by bending the periodic pattern on a macro- or micro-scale, by local stretching, by local rotation, or by any combination thereof. Diffraction patterns of crystallized material with irregularities display similarities to the pseudo-random carrier phenomenon. An examination of the transforms of large numbers of different arrangements of representations of real and hypothetical chemical structures would allow additional implementations in accordance with the invention. In the case of applications in which spatial filtering would be desired, the extension and shape of the power spectrum of the carrier, as well as the image micro texture, should be considered.

Objects with periodic structures cause distrubing moire effects when a regular carrier is used. A random or pseudo-random carrier serves to eliminate or reduce these phenomena. A comparison could be made between a regular two-dimensional spatial pulse carrier and a pseudo-random carrier with a one-dimensional grating structure with monotonically increasing frequency superimposed on the respective carriers in order to demonstrate this result. In the latter case, the existence of any moire fringes would be lacking.

Random and pseudo-random carriers are useful for the same and similar applications as regular carriers. More specifically, the invention provides a valuable tool for storing optical information in phase-only recording media. The random carriers utilized in accordance with the invention possess capabilities for multiplexing and interlacing which are valuable features in optical storage, image display, and spatial filtering applications. Most significant, is the ability to control image characteristics and color in the reconstructed images from black and white or phase recordings. The feature of controllable phase randomization is extremely advantageous in display and projection applications. Some physical processes are even inherent in random or pseudo-random distributions, e.g., film grain noise and natural wrinkling of phase media such as gelatine layers, thermoplastics, elastomers, and other deformographic media.

The random carrier features in accordance with the invention may even be employed in combination with the random physical features characteristic of the recording material. A more sophisticated way of controlling the random carrier features alone or in combination with random physical features is to introduce computer-generated carriers resulting from the application of programs which practice the invention. Obviously, many modifications of the present invention are possible in light of this teaching. It is therefore to be understood that, in the scope of the appended claims, the invention may be practiced other than as specifically described.

What is claimed is:

1. A method of storing optical information on a random carrier comprising the steps of:

providing a carrier comprised of a pseudo-random distribution of pulses, the spatial variation in the pulse parameters being at least equal to the wavelength of light;

modulating said distribution of pulses with optical information characterizing physical parameters of an illuminated object such that a microstructure is formed of a modified distribution of pulses with the optical information coded thereon; and recording the microstructure on a storage medium.

2. The method of claim 1 wherein is further included the step of reconstructing said optical information from said microstructure.

3. The method of claim 1 wherein the storage medium is of an optically sensitive material which provides a carrier comprised of optical pulses in a pseudo-random distribution coded with optical information from the object.

4. The method of claim 3 wherein is further included the step of reconstructing an image of the object from the microstructure defined by said distribution of optical pulses.

5. The method of claim 4 wherein said reconstructing step includes the steps of illuminating said microstructure with spatially coherent light and imaging the resulting diffracted irradiance onto an image plane.

6. The method of claim 5 wherein is further included the step of spatially filtering said irradiance between said microstructure and said image plane.

7. The method of claim 6 wherein said distribution of pulses is randomized such that a microtexture is provided in the image formed in said image plane.

8. The method of claim 7 wherein said irradiance is imaged by a telecentric lens system whereby a double Fourier transform of the diffracted irradiance reconstructs the image in said image plane.

9. The method of claim 3 wherein the storage medium is a photographic emulsion which provides a carrier comprised of a distribution of grains.

10. The method of claim 3 wherein the storage medium is of deformagraphic material which provides a carrier comprised of a distribution of wrinkles.

11. The method of claim 1 wherein the number of pulses in said distribution is modulated in accordance with the intensity of said optical information.

12. The method of claim 1 wherein the width of pulses in said distribution is modulated in accordance with the intensity of said optical information.

13. The method of claim 1 wherein the number and width of pulses in said distribution is modulated in accordance with the intensity of said optical information.

14. The method of claim 11 wherein said distribution is a distribution of optical pulses coded with optical information and wherein is further included the step of reconstructing said optical information from said distribution whereby a randomness of reconstructed light in regard to both density and intensity is achieved.

* * * * *